(12) United States Patent
Hoshina et al.

(10) Patent No.: US 10,096,833 B2
(45) Date of Patent: Oct. 9, 2018

(54) ELECTRODE, NONAQUEOUS ELECTROLYTE BATTERY, AND BATTERY PACK

(71) Applicant: Kabushiki Kaisha Toshiba, Minato-ku (JP)

(72) Inventors: Keigo Hoshina, Yokohama (JP); Yoshiyuki Isozaki, Tokyo (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 302 days.

(21) Appl. No.: 15/064,915

(22) Filed: Mar. 9, 2016

(65) Prior Publication Data

US 2016/0190586 A1    Jun. 30, 2016

Related U.S. Application Data

(63) Continuation of application No. PCT/JP2013/075534, filed on Sep. 20, 2013.

(51) Int. Cl.
*H01M 4/58* (2010.01)
*H01M 4/36* (2006.01)
(Continued)

(52) U.S. Cl.
CPC .......... *H01M 4/5825* (2013.01); *C01B 25/45* (2013.01); *H01M 4/136* (2013.01); *H01M 4/364* (2013.01);
(Continued)

(58) Field of Classification Search
CPC ............... H01M 4/5825; H01M 4/485; H01M 2004/021; H01M 2004/028; H01M 4/136;
(Continued)

(56) References Cited

U.S. PATENT DOCUMENTS

2008/0176142 A1    7/2008    Inagaki et al.
2009/0081534 A1    3/2009    Takami et al.
(Continued)

FOREIGN PATENT DOCUMENTS

CN    101427416 A    5/2009
CN    102903914 A    1/2013
(Continued)

OTHER PUBLICATIONS

International Search Report dated Dec. 24, 2013, in PCT/JP2013/075534, filed Sep. 20, 2013 (with English Translation).
(Continued)

*Primary Examiner* — Laura Weiner
(74) *Attorney, Agent, or Firm* — Oblon, McClelland, Maier & Neustadt, L.L.P.

(57) ABSTRACT

According to one embodiment, an electrode is provided. This electrode includes a current collector and an electrode layer formed on the current collector. The electrode layer contains an active material represented by $LiMn_{1-x-y}Fe_xA_yPO_4$ (where $0<x\le0.3$, $0\le y\le0.1$, and A is at least one selected from the group consisting of Mg, Ca, Al, Ti, Zn, and Zr). A pore diameter appearing at highest frequency in pore diameter distribution of the electrode layer obtained by mercury porosimetry falls within a range of 10 nm to 50 nm. A pore specific surface area of the electrode layer is from 12 $m^2/g$ to 30 $m^2/g$.

10 Claims, 6 Drawing Sheets

(51) Int. Cl.
    H01M 4/525    (2010.01)
    H01M 4/505    (2010.01)
    H01M 4/136    (2010.01)
    H01M 4/485    (2010.01)
    C01B 25/45    (2006.01)
    H01M 4/02     (2006.01)
(52) U.S. Cl.
    CPC .......... *H01M 4/485* (2013.01); *H01M 4/505* (2013.01); *H01M 4/525* (2013.01); *H01M 4/366* (2013.01); *H01M 2004/021* (2013.01); *H01M 2004/027* (2013.01); *H01M 2004/028* (2013.01)
(58) Field of Classification Search
    CPC ...... H01M 4/366; H01M 4/364; H01M 4/505; H01M 4/525; H01M 2004/027
    See application file for complete search history.

(56) References Cited

U.S. PATENT DOCUMENTS

| | | |
|---|---|---|
| 2012/0183839 A1 | 7/2012 | Yuasa et al. |
| 2012/0189915 A1 | 7/2012 | Cho et al. |
| 2013/0029225 A1 | 1/2013 | Matsui et al. |
| 2013/0052535 A1 | 2/2013 | Yanagihara et al. |
| 2015/0188139 A1* | 7/2015 | Kitagawa ............ H01M 4/5825 429/221 |

FOREIGN PATENT DOCUMENTS

| | | |
|---|---|---|
| JP | 2008-34306 | 2/2008 |
| JP | 2008-41402 | 2/2008 |
| JP | 2009-81048 | 4/2009 |
| JP | 2011-76820 | 4/2011 |
| JP | 2012-151112 A | 8/2012 |
| JP | 2012-195156 A | 10/2012 |
| JP | 2012-195158 A | 10/2012 |
| JP | 2012-234766 A | 11/2012 |
| JP | 2013-30350 | 2/2013 |
| JP | 2013-211228 | 10/2013 |
| WO | WO 2011/089702 | 7/2011 |

OTHER PUBLICATIONS

Written Opinion dated Dec. 24, 2013, in PCT/JP2013/075534, filed Sep. 20, 2013.
Seung-Min Oh, et al., "High-Performance Carbon-LiMnPO$_4$ Nanocomposite Cathode for Lithium Batteries," *Advanced Functional Materials*, 20, 3260-3265 (2010).
Combined Office Action and Search Report dated Mar. 28, 2017 in Chinese patent application No. 201380079327.6.

* cited by examiner

ELECTRODE, NONAQUEOUS ELECTROLYTE BATTERY, AND BATTERY PACK

CROSS-REFERENCE TO RELATED APPLICATIONS

This application is a Continuation Application of PCT Application No. PCT/JP2013/075534, filed Sep. 20, 2013, the entire contents of which are incorporated herein by reference.

FIELD

Embodiments of the present invention relate to an electrode, a nonaqueous electrolyte battery, and a battery pack.

BACKGROUND

A nonaqueous electrolyte battery which is charged and discharged by movement of lithium ions between negative and positive electrodes has been actively studied as a high energy density battery.

The nonaqueous electrolyte battery is expected to be utilized also as medium or large size power sources as well as power sources for miniature electronic devices. Cycle life characteristics and high stability are required in such medium or large size applications.

As a positive electrode active material of a nonaqueous electrolyte battery, a lithium transition metal composite oxide is used, for example. As a transition metal, Co, Mn, Ni, or the like is used. As inexpensive and highly stable positive electrode materials, spinel type lithium manganate, olivine type compounds such as olivine type lithium iron phosphate, and olivine type lithium manganese phosphate have been actively studied in recent years.

Among these, since the olivine type compounds have a low electron conductivity, it has been difficult to obtain good rate performance. In particular, it has been difficult to obtain a lithium manganese phosphate having good charge/discharge properties.

DETAILED DESCRIPTION

According to the first embodiment, an electrode is provided. This electrode includes a current collector and an electrode layer formed on the current collector. The electrode layer contains an active material represented by $LiMn_{1-x-y}Fe_xA_yPO_4$ (where $0<x\leq0.3$, $0\leq y\leq0.1$, and A is at least one selected from the group consisting of Mg, Ca, Al, Ti, Zn, and Zr). A pore diameter appearing at highest frequency in pore diameter distribution of the electrode layer obtained by mercury porosimetry falls within a range of 10 nm to 50 nm. A pore specific surface area of the electrode layer is from 12 $m^2/g$ to 30 $m^2/g$. One sort of the A may be used alone or two sorts or more may be used in combination.

According to the second embodiment, a nonaqueous electrolyte battery can be provided. The nonaqueous electrolyte battery comprises a negative electrode, a positive electrode, and a nonaqueous electrolyte. The positive electrode is the electrode according to the first embodiment. The negative electrode contains a negative electrode active material.

According to a third embodiment, a battery pack is provided. The battery pack includes the nonaqueous electrolyte battery according to the second embodiment.

Embodiments of the present invention will be described below with reference to the accompanying drawings. The same reference symbols denote components having the same or similar functions throughout all of the drawings and their duplicated descriptions will be omitted. Each drawing is a schematic diagram for explaining the embodiments and for facilitating understanding of the embodiments and may represent different shapes, dimensional ratios, and the like from those of the actual device. Hence, these structural designs may be properly changed taking the following explanations and known technologies into consideration.

First Embodiment

According to the first embodiment, an electrode for a nonaqueous electrolyte battery is provided. This electrode includes a current collector and an electrode layer formed on the current collector. The electrode layer contains an active material represented by $LiMn_{1-x-y}Fe_xA_yPO_4$ (where $0<x\leq0.3$, $0\leq y\leq0.1$, and A is at least one selected from the group consisting of Mg, Ca, Al, Ti, Zn, and Zr). A pore diameter appearing at highest frequency in pore diameter distribution of the electrode layer obtained by mercury porosimetry falls within a range of 10 nm to 50 nm. A pore specific surface area of the electrode layer is from 12 $m^2/g$ to 30 $m^2/g$.

In iron-containing lithium manganese phosphate, the electrical conductivity can be improved by carbon coating. However, the electrical conductivity between lithium manganese phosphate particles dispersed in an electrode layer may be insufficient only by incorporating such lithium manganese phosphate into an electrode.

In view of the above circumstances, as a result of intensive studies, the present inventors found that an electrode including an electrode layer containing iron-containing lithium manganese phosphate and satisfying the above conditions both of pore diameter distribution and pore specific surface area can provide a nonaqueous electrolyte battery excellent in rate characteristics.

The electrode layer in which the pore diameter distribution and the pore specific surface area are in the above range can achieve excellent impregnation properties of a nonaqueous electrolyte when the electrode layer is used in a nonaqueous electrolyte battery and excellent electrical conductivity of an active material in the electrode layer and, in addition can have a sufficient reaction area. Because of this, a nonaqueous electrolyte battery using this electrode layer can exhibit excellent rate characteristic.

If the pore diameter appearing at highest frequency in the pore diameter distribution of the electrode layer obtained by mercury porosimetry is less than 10 nm, the impregnation properties of a nonaqueous electrolyte is inferior when the electrode layer is used in a nonaqueous electrolyte battery. Meanwhile, if the pore diameter appearing at highest frequency is more than 50 nm, the electrical conductivity of an active material in the electrode layer is poor, and elevated resistance is exhibited.

If the pore specific surface area of the electrode layer is less than 12 $m^2/g$, the reaction area is reduced too much. Meanwhile, if the pore specific surface area is more than 12 $m^2/g$, the reaction area becomes excessive, and resistance may be possibly increased by a surface coating produced by an excessive reaction.

If an electrode layer is not one containing iron-containing lithium manganese phosphate represented by the above chemical formula, $LiMn_{1-x-y}Fe_xA_yPO_4$, it cannot be expected to achieve enhancement of rate characteristics even if the pore diameter distribution and the pore specific surface area are adjusted to satisfy the above condition. For example, the present inventors have demonstrated that enhancement of the rate cannot be achieved even if the pore diameter distribution and the pore specific surface area in the electrode layer containing lithium manganese phosphate not containing iron are adjusted to satisfy the above condition, as shown in Examples 5 to 7 to be described later.

In the electrode layer, it is preferable that a pore volume per 1 g of the electrode layer falls within a range of 0.17 mL to 0.29 mL. When the electrode layer in which the pore volume is in this range is used in a nonaqueous electrolyte battery, a sufficient amount of a nonaqueous electrolyte can be held inside an electrode, and, at the same time, the electrode layer can be prevented from being peeled from a current collector.

In the electrode layer, it is preferable that the density is from 2 $g/cm^3$ to 2.3 $g/cm^3$. An electrode including an electrode layer whose density is in this range is less likely to be cracked and can exhibit an excellent balance between an energy density and flexibility.

In the electrode layer, a carbon material is allowed to be adhered to at least a portion of a surface of an active material. Consequently, electron conductivity of the active material can be enhanced. The carbon material is preferably a carbonaceous material having a interplanar spacing $d_{002}$ at a (002) plane as measured by powder X-ray diffraction of 0.344 nm or more. Since such a carbonaceous material can be produced at a low firing temperature of approximately 700° C., crystallinity of an active material does not become too high, and Li insertion/extraction characteristics of active material particles can be improved.

The pore diameter distribution in the electrode layer using the mercury porosimetry is obtained by the following procedure.

First, an electrode to be inspected is provided. When the electrode is incorporated in a nonaqueous electrolyte battery, the nonaqueous electrolyte battery is first disassembled after the nonaqueous electrolyte battery is brought into a discharge state, and a positive or negative electrode is taken out. The taken-out electrode is cleaned using a chain carbonate such as ethyl methyl carbonate. After that, the electrode is dried. The dried electrode is cut into a size of approximately 10 mm×25 mm to obtain a sample.

Subsequently, the obtained sample is set in a measurement device. The set sample is subjected to the mercury porosimetry, whereby the pore diameter distribution in the electrode layer can be obtained.

The analysis principle of the mercury porosimetry is based on the Washburn's equation (1).

$$D = -4\gamma \cos \theta / P \quad (1)$$

Here, P represents a pressure to be applied, D represents a pore diameter, γ represents a surface tension of mercury (480 dyne·$cm^{-1}$), and θ represents a contact angle between mercury and pore wall surface which is 140°. Since γ and θ are constant, a relationship between the applied pressure P and the pore diameter D is obtained by the Washburn's equation, and a pore diameter and a volume distribution thereof can be derived by measuring a mercury intrusion volume at that time. For details of the measuring method, principle and the like, see "BIRYU SHI HANDO BUKKU (Fine Particle Handbook)" by Genji Jimbo et al., Asakura Publishing (1991) or "HUNTAI BUSSEI SOKUTEI HO (Powder Properties Measuring Method)" edited by Sohachiro Hayakawa, Asakura Publishing (1978).

The pore specific surface area and the pore volume of the electrode layer are obtained from the pore diameter distribution thus obtained. The mass of the electrode layer used for obtaining the pore specific surface area and the pore volume is a mass of an electrode layer alone obtained by subtracting a mass of a current collector from a mass of an electrode.

Next, an electrode according to a first embodiment will be described in more detail.

A current collector may preferably be an aluminum foil or an aluminum alloy foil containing at least one element selected from Mg, Ti, Zn, Mn, Fe, Cu, and Si.

An electrode layer may be formed on one or both surfaces of the current collector. The electrode layer may contain an active material, a conductive agent, and a binder.

The active material may contain various oxides in addition to iron-containing lithium manganese phosphate.

Examples of those oxides include lithium-manganese composite oxide that Li or Li ion is inserted to (such as $Li_xMn_2O_4$ or $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $Li_xMn_yCo_{1-y}O_2$), lithium-nickel-cobalt-manganese composite oxide (such as $LiNi_{1-y-z}Co_yMn_zO_2$), lithium-nickel-cobalt-aluminum composite oxide (such as $LiNi_{1-y-z}Co_yAl_zO_2$), and lithium-manganese-nickel composite oxide having a spinel structure ($Li_xMn_{2-y}Ni_yO_4$). Here, it is preferable that 0<x≤1, 0≤y≤1, and 0≤z≤1.

Among those, lithium-manganese composite oxide ($Li_xMn_2O_4$), lithium-cobalt composite oxide ($Li_xCoO_2$), lithium-nickel-cobalt composite oxide ($Li_xNi_{1-y}Co_yO_2$) lithium-manganese-cobalt composite oxide ($Li_xMn_yCo_{1-y}O_2$), and lithium-nickel-cobalt-manganese composite oxide (such as $LiNi_{1-y-z}Co_yMn_zO_2$) that Li or Li ion is inserted to are preferable. Here, it is preferable that 0<x≤1, 0≤y≤1, and 0≤z≤1.

The conductive agent can improve the current collecting performance and reduce the contact resistance between the active material and the current collector. Examples of the conductive agent include carbonaceous materials such as acetylene black, carbon black, graphite, carbon nanofiber, and carbon nanotube. Those carbonaceous materials may be used singly, or a plural of carbonaceous materials may be used.

The binder can bind the active material and the conductive agent with the current collector. Examples of the binder include a polytetrafluoroethylene (PTFE), polyvinylidene fluoride (PVdF), and fluoro-rubber.

It is preferable that the active material, the conductive agent, and the binder are respectively blended in an amount of from 80% by mass to 95% by mass, from 3% by mass to 18% by mass, and from 2% by mass to 17% by mass. The conductive agent can produce the aforementioned effect by blending it in an amount of 3% by mass or more. The conductive agent can reduce decomposition of the nonaqueous electrolyte on a surface of the conductive agent by blending it in an amount of 18% by mass or less when the nonaqueous electrolyte is stored at high temperatures. When the binder is formulated in an amount of 2% by mass or more, sufficient electrode strength can be obtained. When the binder is formulated in an amount of 17% by mass or less, the amount of the binder as an insulating material in the electrode can be reduced, making possible to reduce internal resistance.

The electrode according to the first embodiment can be produced by the following method, for example.

First, iron-containing lithium manganese phosphate which is an active material is provided. As iron-containing lithium manganese phosphate, iron-containing lithium manganese phosphate formed into secondary particles by granulation of primary particles may be used, for example. Alternatively, ungranulated iron-containing lithium manganese phosphate particles may be used. As the primary particles, primary particles having a sharp particle size distribution of approximately 100 nm or less and having a surface uniformly coated with carbon are preferably used.

This active material, the conductive agent, and the binder are introduced into a solvent such that the blending ratio is the aforementioned blending ratio, and, thus, to be kneaded, thus preparing a slurry. This slurry is coated onto both surfaces or one surface of the current collector and then dried. After drying, press processing is performed, whereby the electrode according to the first embodiment can be produced.

The pore diameter distribution, the pore specific surface area, the pore volume, and the density of the electrode layer depend on a degree of adhesiveness between active material particles in the electrode layer and a degree of adhesiveness between the active material and other materials. Those degrees of adhesiveness may be affected by, for example, the particle diameters of the primary particles and the secondary particles of iron-containing lithium manganese phosphate, the kind of the conductive agent to be used, and a degree of crumbling a part of the secondary particles. For example, when those changeable conditions are compositely adjusted, it is possible to produce an electrode containing iron-containing lithium manganese phosphate and including an electrode layer satisfying the conditions of the pore diameter distribution and the conditions of the whole pore specific surface area described above.

The degree of crumbling a part of the secondary particles may be affected by, for example, load in a press process. For example, when some of the secondary particles are crumbled a part in the press process, the adhesiveness between the primary particles can be enhanced, and, at the same time, the pore diameter can be adjusted. Also when ungranulated primary particles are used as active material particles, the adhesiveness between particles is enhanced by the press process, and the pore diameter can be adjusted.

When scale-like carbon is contained as the conductive agent, the scale-like carbon can play a role similar to that of a lubricant between particles in the press process and can not only enhance the adhesiveness between the active material particles but contribute to improvement of the electrode density.

In the press process, hot pressing can be performed using a roller of 80° C. or more, for example, so that the electrode layer can be easily pressed. In such a manner, minute pores of approximately from 10 nm to 50 nm can be easily formed. Further, in such a manner, the pores in the electrode layer can be reduced in size and, at the same time, can be uniformed.

In addition, an electrode having minute pores can be produced by performing press processing a plural of times. For example, in a first press process, press processing is performed with low load. Consequently, although the adhesiveness between the active material particles is less likely to be enhanced, the adhesiveness between the active material particles and the conductive agent and/or the binder can be enhanced. Then, in subsequently performed second press processing, when press processing is performed with high load, minute pores can be formed between the active material particles and between the conductive agent and the binder.

Next, an electrode of an example according to the first embodiment will be described with reference to FIG. 1.

Figure 1:
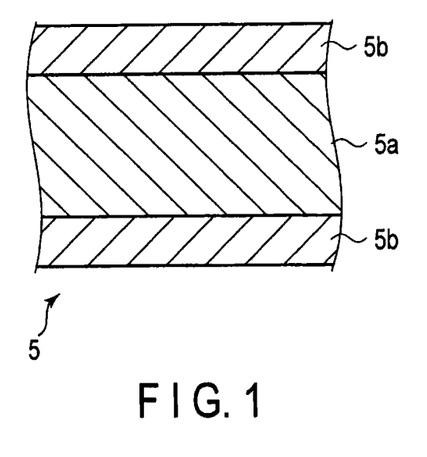
FIG. 1 is a schematic partial cross-sectional view of an electrode of an example according to a first embodiment.

FIG. 1 is a schematic partial cross-sectional view of the electrode of an example according to the first embodiment.

An electrode 5 shown in FIG. 1 includes a current collector 5a and an electrode layer 5b. The electrode layers 5b are formed on each surface of the current collector 5a.

In the electrode according to the first embodiment a pore diameter appearing at highest frequency in the pore diameter distribution of a positive electrode containing iron-containing lithium manganese phosphate falls within a range of 10 nm to 50 nm, and the pore specific surface area of the electrode layer is from 12 $m^2/g$ to 30 $m^2/g$, so that a nonaqueous electrolyte battery excellent in rate characteristics can be achieved.

Second Embodiment

According to the second embodiment, a nonaqueous electrolyte battery can be provided. The nonaqueous electrolyte battery comprises a negative electrode, a positive electrode, and a nonaqueous electrolyte. The positive electrode is the electrode according to the first embodiment. The negative electrode contains a negative electrode active material.

Next, a nonaqueous electrolyte secondary battery according to the second embodiment will be described in more detail.

The nonaqueous electrolyte battery according to the second embodiment may further include a separator, a container member, a positive electrode terminal, and a negative electrode terminal.

The negative electrode and the positive electrode can constitute an electrode group while interposing a separator between the negative electrode and the positive electrode. The nonaqueous electrolyte can be held by the electrode group. The container member can contain the electrode group and the nonaqueous electrolyte. The positive electrode terminal can be electrically connected to the positive electrode. The negative electrode terminal can be electrically connected to the negative electrode.

Hereinafter, the negative electrode, the nonaqueous electrolyte, the separator, the container member, the positive electrode terminal, and the negative electrode terminal will be described in detail.

Negative Electrode

The negative electrode may include a negative electrode current collector and a negative electrode layer. A negative electrode active material may be contained in the negative electrode layer. The negative electrode layer may contain one or more kinds of negative electrode active materials. The negative electrode layer may further contain a conductive agent and a binder. The negative electrode layer may be formed on one or both surfaces of the negative electrode current collector.

The negative electrode current collector is preferably formed of a chemically stable material in a potential range higher than 1.0 V (vs. Li/Li$^+$), for example, an aluminum foil or an aluminum alloy foil containing elements such as Mg, Ti, Zn, Mn, Fe, Cu, and Si.

As the negative electrode active material, a negative electrode active material having a Li insertion/extraction potential is 0.8 V (vs. Li/Li$^+$) or more is preferably used. In particular, titanium composite oxide is preferably used. Examples of the titanium composite oxide include titanium-containing oxides such as lithium titanate having a spinel structure, monoclinic β-type titanium composite oxide, anatase-type titanium composite oxide, and ramsdelite-type lithium titanate. Among them, lithium titanate having a spinel structure is preferable because it is excellent in cycle performances and rate characteristics. Moreover, the negative electrode active material may contain niobium composite oxide. Examples of niobium composite oxide include $Nb_2O_5$ and $TiNb_2O_7$. One sort of the negative electrode active material may be used alone or two sorts or more may be used in combination.

In terms of energy density, a negative electrode active material having a Li insertion/extraction potential is 2.0 V (vs. Li/Li$^+$) or less is preferably used.

As the conductive agent and the binder, similar those which can be used in the electrode according to the first embodiment may be used.

In the blending ratio of the negative electrode active material, the conductive agent, and the binder, it is preferable that the negative electrode active material is blended in an amount of from 70% by mass to 96% by mass, the conductive agent is blended in an amount of from 2% by mass to 28% by mass, and the binder is blended in an amount of from 2% by mass to 28% by mass. If the conductive agent is blended in an amount of less than 2% by mass, there is a fear that the current collecting performance of the negative electrode layer is lowered and the large-current performance of the nonaqueous electrolyte battery is deteriorated. If the binder is blended in an amount of less than 2% by mass, there is a fear that the binding ability of the negative electrode layer with the negative electrode current collector is deteriorated, leading to deteriorated cycle performances. Meanwhile, in terms of higher capacity, the conductive agent and the binder are preferably blended in an amount of 28% by mass or less.

The negative electrode can be produced by the following method, for example. First, the negative electrode active material, the conductive agent, and the binder are suspended in a solvent to prepare a slurry. This slurry is coated onto one or both surfaces of the negative electrode current collector to be dried, and, thus, to form a negative electrode layer. After that, the negative electrode layer is pressed. Alternatively, the negative electrode active material, the conductive agent, and the binder are formed into a pellet, and the pellet may be used as the negative electrode layer.

Nonaqueous Electrolyte

As the nonaqueous electrolyte, a liquid nonaqueous electrolyte or a gel-like nonaqueous electrolyte may be used. The liquid nonaqueous electrolyte is prepared by dissolving an electrolyte into an organic solvent. The concentration of the electrolyte is preferably in a range of 0.5 mol/l to 2.5 mol/l. The gel-like nonaqueous electrolyte is prepared by compounding a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$]. Those electrolytes may be used either singly or in combinations of two or more. The electrolyte preferably contains $LiPF_6$.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF) or dioxolan (DOX), chain ethers such as dimethoxyethane (DME) and diethoethane (DEE), γ-butyrolactone (GBL), acetonitrile (AN), and sulfolan (SL). These organic solvents may be used either singly or in combinations of two or more.

More preferable examples of the organic solvent include a mixed solvent obtained by mixing two or more kinds selected from the group consisting of propylene carbonate (PC), ethylene carbonate (EC), diethyl carbonate (DEC), dimethyl carbonate (DMC), and methylethyl carbonate (MEC) and a mixed solvent containing γ-butyrolactone (GBL). By virtue of the use of such a mixed solvent, a nonaqueous electrolyte battery excellent in low-temperature characteristics can be obtained.

Examples of the polymer material include polyvinylidene-fluoride (PVdF), polyacrylonitrile (PAN), and polyethylene oxide (PEO).

Separator

As the separator, a porous film formed of a material such as polyethylene, polypropylene, cellulose, or polyvinylidene fluoride (PVdF), synthetic resin nonwoven fabric, or the like may be used. Among these materials, a porous film formed of polyethylene or polypropylene melts at a fixed temperature, making it possible to shut off current and is therefore preferable in terms of improvement in safety.

Container Member

As the container member, a bag-like container made of a laminate film or a metal container is used.

Examples of the shape of the container include a flat type, an angular type, a cylinder type, a coin type, a button type, a sheet type, and a laminate type. Of course, examples of the container include containers for miniature batteries to be mounted in, for example, mobile electronic devices or containers for large batteries to be mounted on, for example, two-wheel or four-wheel vehicles.

As the laminate film, for example, a multilayer film prepared by interposing a metal layer between resin films is used. Preferably, the metal layer is formed of an aluminum foil or aluminum alloy foil to reduce the weight of the battery. As the resin film, polymer materials such as polypropylene (PP), polyethylene (PE), nylon, and polyethylene terephthalate (PET) may be used. It is preferable that the laminate film has a thickness of 0.2 mm or less.

The metal container may be formed of aluminum or an aluminum alloy. The aluminum alloy preferably contains elements such as magnesium, zinc, and silicon. Meanwhile, the contents of transition metals such as iron, copper, nickel, and chromium are preferably 100 ppm or less. Thus, long-term reliability under high-temperature environment and thermal radiation property can be improved dramatically. The wall thickness of the metal container is preferably 0.5 mm or less and more preferably 0.2 mm or less.

Positive Electrode Terminal

The positive electrode terminal is electrically stable in a potential range of 3.0 V to 4.5 V with respect to lithium ion metal and is preferably formed of a material having electroconductivity. The positive electrode terminal is preferably formed of aluminum or aluminum alloy containing elements such as Mg, Ti, Zn, Mn, Fe, Cu, and Si. The positive electrode terminal is preferably formed of a material similar to that of the positive electrode current collector to reduce the contact resistance with the positive electrode current collector.

Negative Electrode Terminal

The negative electrode terminal is electrically stable in a potential range of 1.0 V to 3.0 V with respect to lithium ion metal and is preferably formed of a material having electroconductivity. The negative electrode terminal is preferably formed of aluminum or aluminum alloy containing elements such as Mg, Ti, Zn, Mn, Fe, Cu, and Si. The negative electrode terminal is preferably formed of a material similar to that of the negative electrode current collector to reduce the contact resistance with the negative electrode current collector.

Next, an example of the nonaqueous electrolyte battery according to the second embodiment will be described with reference to the drawings.

First, a flat-type nonaqueous electrolyte battery which is an example of the nonaqueous electrolyte battery according to the second embodiment will be described with reference to FIGS. 2 and 3.

Figure 2:
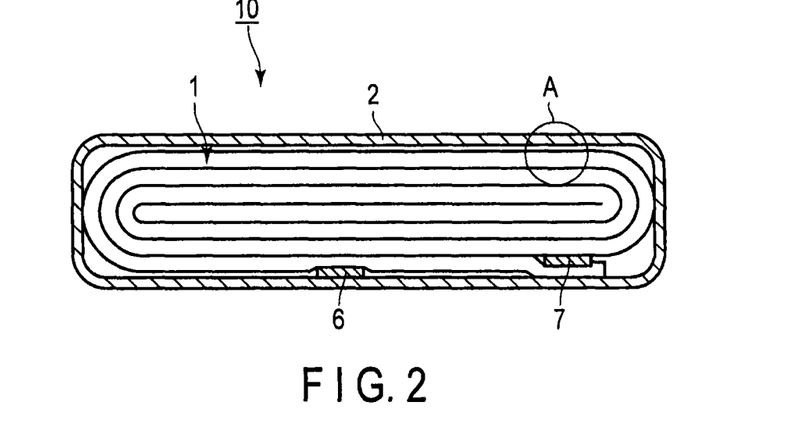
FIG. 2 is a schematic partial cross-sectional view of a flat-type nonaqueous electrolyte battery of an example according to a second embodiment.

FIG. 2 is a cross-sectional schematic diagram of a flat-type nonaqueous electrolyte secondary battery of an example according to the second embodiment. FIG. 3 is an enlarged cross-sectional view of an A portion of FIG. 2.

Figure 3:
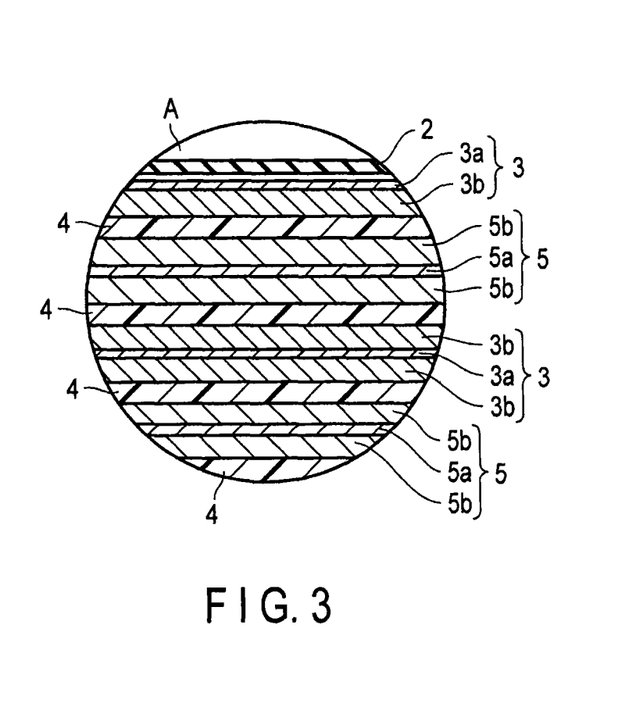
FIG. 3 is an enlarged cross-sectional view of an A portion of FIG. 2.

A nonaqueous electrolyte battery 10 shown in FIGS. 2 and 3 comprises a flat coil electrode group 1.

The flat coil electrode group 1 is provided with a negative electrode 3, a separator 4, and a positive electrode 5, as shown in FIG. 3. In the negative electrode 3, the separator 4, and the positive electrode 5, the separator 4 is interposed between the negative electrode 3 and the positive electrode 5. This flat coil electrode group 1 can be formed by spirally coiling a laminate, which is formed by stacking the negative electrode 3, the separator 4, and the positive electrode 5 so that the separator 4 is interposed between the negative electrode 3 and the positive electrode 5, so that the negative electrode is positioned outside, as shown in FIG. 3, and by press-molding the coiled laminate.

The negative electrode 3 includes a negative electrode current collector 3a and a negative electrode layer 3b. The outermost negative electrode 3 has a configuration in which as shown in FIG. 3, the negative electrode layer 3b is formed on only one of the inner surfaces of the negative electrode current collector 3a. In other negative electrodes 3, the negative electrode layer 3b is formed on each surface of the negative electrode current collector 3a.

In the positive electrode 5, a positive electrode layer 5b is formed on each surface of a positive electrode current collector 5a.

As shown in FIG. 2, in the vicinity of the outer peripheral end of the coil electrode group 1, a negative electrode terminal 6 is connected to the negative electrode current collector 3a of the outermost negative electrode 3, and a positive electrode terminal 7 is connected to the positive electrode current collector 5a of the inside positive electrode 5.

The coil electrode group 1 is accommodated in a bag-like container 2 made of a laminate film in which a metal layer is interposed between two resin layers.

The negative electrode terminal 6 and the positive electrode terminal 7 extend outside from an opening of the bag-like container 2. For example, a liquid nonaqueous electrolyte is injected through the opening of the bag-like container 2 and stored in the bag-like container 2.

In the bag-like container 2, the coil electrode group 1 and the liquid nonaqueous electrolyte are perfectly sealed by heat sealing the opening while holding the negative electrode terminal 6 and the positive electrode terminal 7.

Next, a flat-type nonaqueous electrolyte battery which is another example of the nonaqueous electrolyte battery according to the second embodiment will be described with reference to FIGS. 4 and 5.

Figure 4:
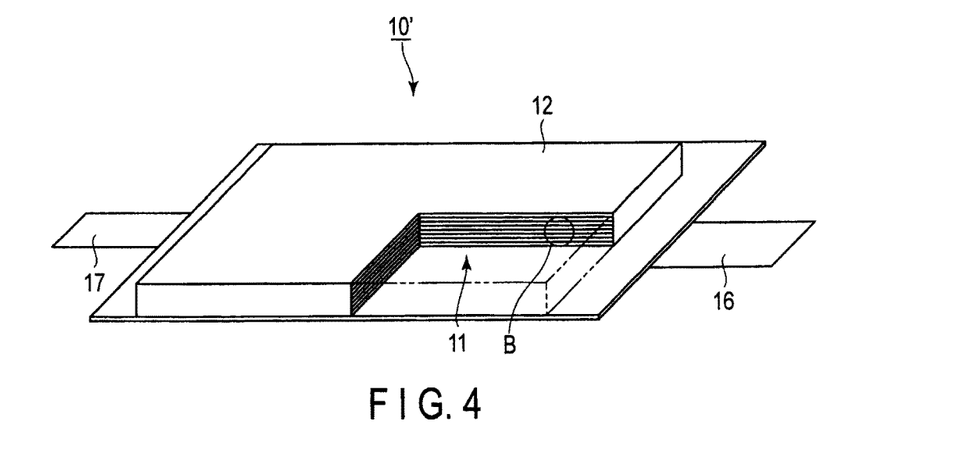
FIG. 4 is a partially notched perspective view schematically showing a flat-type nonaqueous electrolyte battery of another example according to the second embodiment.

FIG. 4 is a partially notched perspective view schematically showing the flat-type nonaqueous electrolyte battery of another example according to the second embodiment. FIG. 5 is a cross-sectional schematic diagram of a B portion of FIG. 4.

Figure 5:
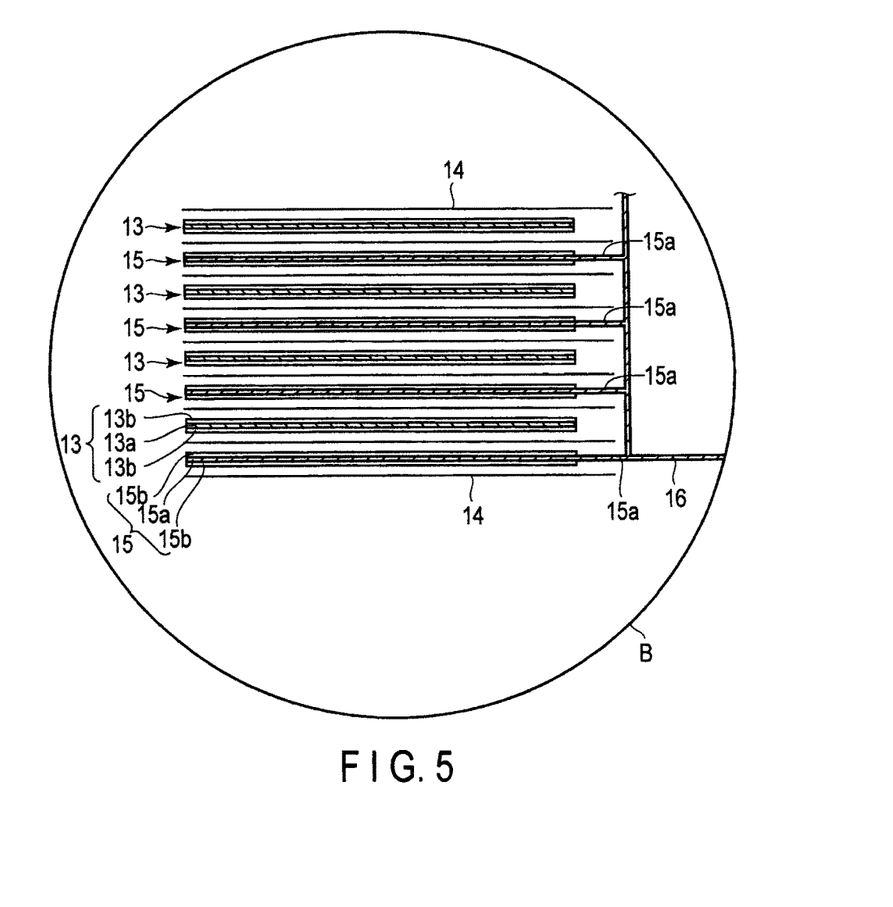
FIG. 5 is an enlarged cross-sectional view of a B portion of FIG. 4.

A battery 10' shown in FIGS. 4 and 5 comprises a laminate type electrode group 11.

The laminate type electrode group 11 is stored in a container 12 made of a laminate film in which a metal layer is interposed between two resin films. The laminate type electrode group 11 has a structure in which a positive electrode 13 and a negative electrode 15 are, as shown in FIG. 5, alternately stacked with a separator 14 interposed therebetween. A plural of the positive electrodes 13 exist and are each provided with a positive electrode current collector 13a and a positive electrode layer 13b carried on each side of the positive electrode current collector 13a. A plural of the negative electrodes 15 exist and are each provided with a negative electrode current collector 15a and a negative electrode layer 15b carried on each side of the negative electrode current collector 15a. In the negative electrode current collector 15a of each of the negative electrodes 15, one side protrudes from the negative electrodes 15. The protruding negative electrode current collector 15a is electrically connected to a band-shaped negative electrode terminal 16. A distal end of the band-shaped negative electrode terminal 16 is externally drawn out of the container 12. Although not illustrated, in the positive electrode current collector 13a of the positive electrode 13, the side positioned opposite to the protruding side of the negative electrode current collector 15a protrudes from the positive electrode 13. Further, although not illustrated, the positive electrode current collector 13a protruding from the positive electrode 13 is electrically connected to a band-shaped positive electrode terminal 17 shown in FIG. 4. A distal end of the band-shaped positive electrode terminal 17 is positioned opposite to the negative electrode terminal 16 and drawn out of the side of the container 12.

Since the nonaqueous electrolyte battery according to the second embodiment includes the electrode according to the first embodiment as a positive electrode, excellent rate characteristics can be exhibited.

Third Embodiment

According to a third embodiment, a battery pack is provided. The battery pack includes the nonaqueous electrolyte battery according to the second embodiment.

The battery pack according to the third embodiment may be provided with a nonaqueous electrolyte battery or a plural of nonaqueous electrolyte batteries. When the battery pack according to the third embodiment is provided with a plural of nonaqueous electrolyte batteries, unit batteries can be arranged in such a manner that they are electrically connected in series or in parallel or can be arranged by combining series connection and parallel connection.

Next, an example of the battery pack according to the third embodiment will be described with reference to the drawings.

Figure 6:
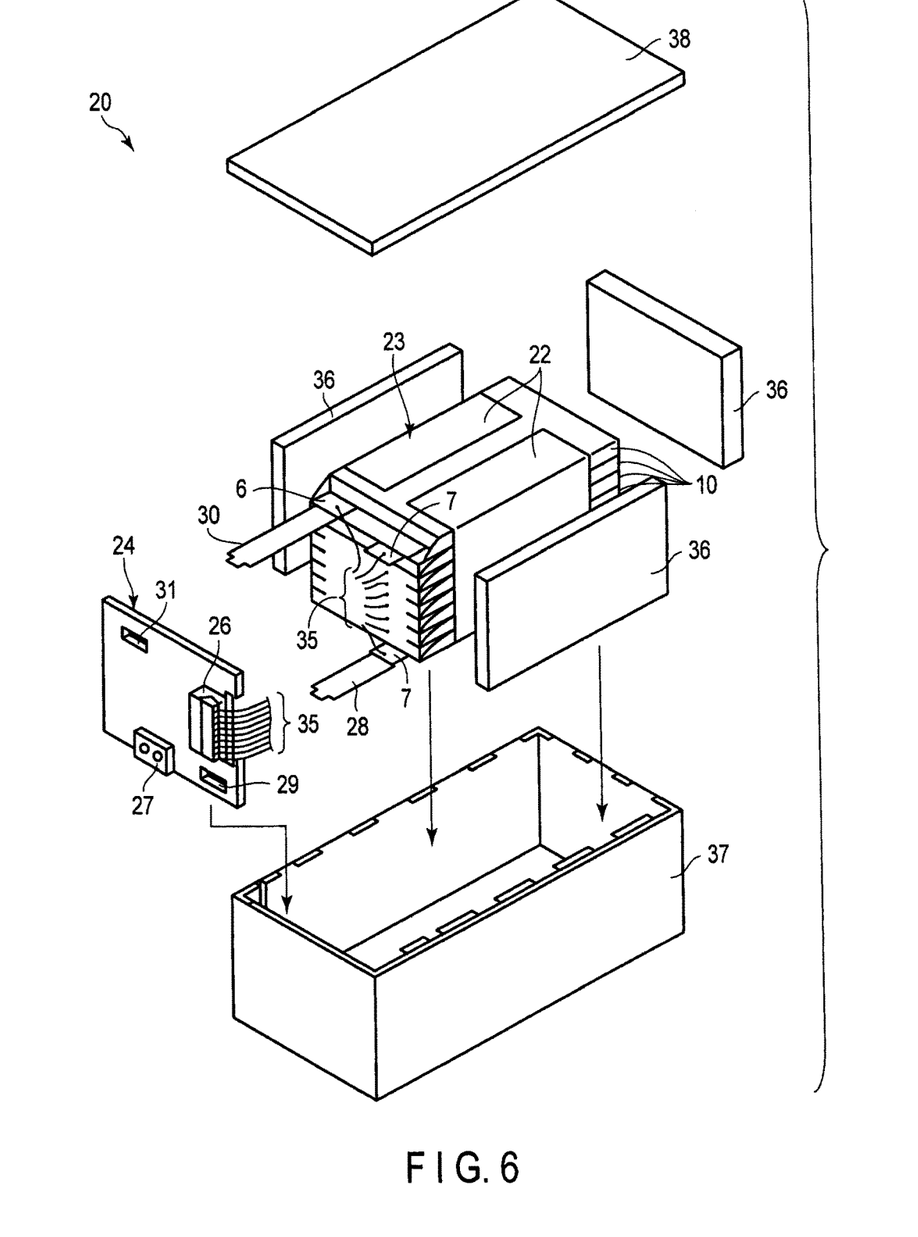
FIG. 6 is an exploded perspective view of a battery pack of an example according to a third embodiment.
Figure 7:
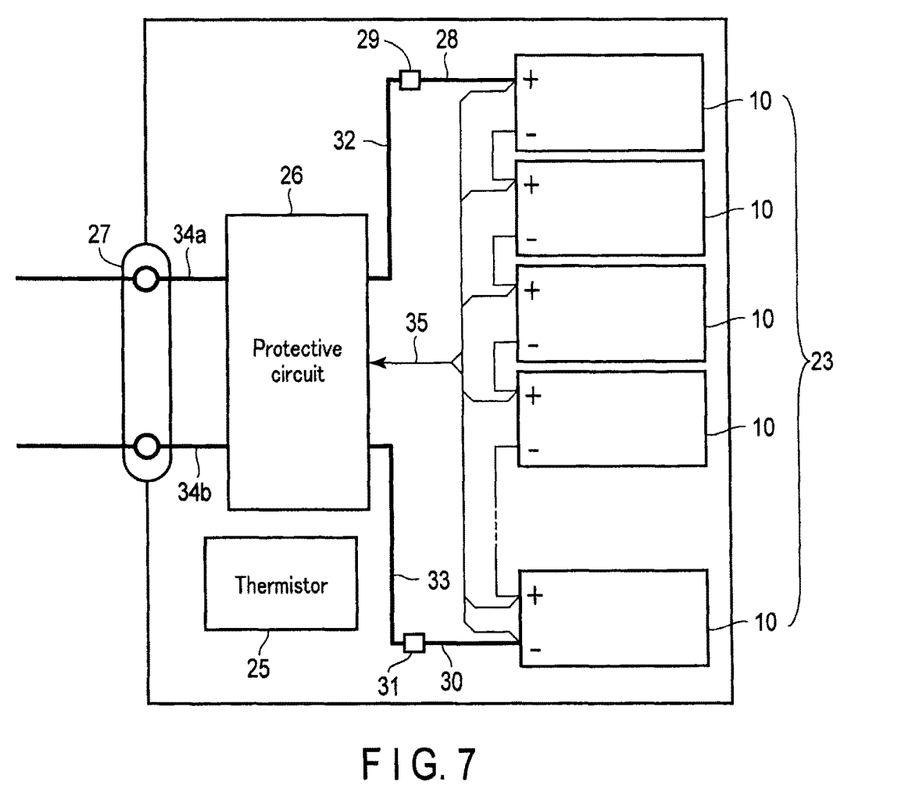
FIG. 7 is a block diagram showing an electrical circuit of the battery pack shown in FIG. 6.

FIG. 6 is an exploded perspective view of a battery pack of an example according to the third embodiment. FIG. 7 is a block diagram showing an electrical circuit of the battery pack shown in FIG. 6.

The battery pack 20 shown in FIGS. 6 and 7 includes a plural of flat-type batteries 10 having the structure shown in FIGS. 2 and 3.

A plural of unit batteries 10 are stacked so that a negative electrode terminal 6 and a positive electrode terminal 7 extending outside are arranged in the same direction and fastened with an adhesive tape 22 to thereby constitute a battery module 23. These unit batteries 10 are electrically connected in series as shown in FIG. 7.

A printed wiring board 24 is disposed opposite to the side surface of each of the unit batteries 10 from which the negative electrode terminal 6 and the positive electrode terminal 7 extend. As shown in FIG. 7, a thermistor 25, a protective circuit 26, and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode lead 28 is connected to the positive electrode terminal 7 of the unit battery 10 positioned on the lowermost layer of the battery module 23, and the distal end of the positive electrode lead 28 is inserted into and electrically connected to a positive electrode connector 29 of the printed wiring board 24. A negative electrode lead 30 is connected to the negative electrode terminal 6 of the unit battery 10 positioned on the uppermost layer of the battery module 23, and the distal end of the negative electrode lead 30 is inserted into and electrically connected to a negative electrode connector 31 of the printed wiring board 24. These connectors 29 and 31 are connected to the protective circuit 26 respectively through wirings 32 and 33 formed on the printed wiring board 24.

The thermistor 25 detects each temperature of the unit batteries 10 and transmits the detected signals to the protective circuit 26. The protective circuit 26 can shut off a plus side wiring 34a and a minus side wiring 34b between the protective circuit 26 and the energizing terminal 27 connected to external devices in a predetermined condition. Examples of the predetermined condition include the case where a signal showing that the temperature of the unit battery 10 is not less than a predetermined temperature is received from the thermistor 25. Another example of the predetermined condition includes the case of detecting overcharge, overdischarge, over-current, and the like of the unit battery 10. The detections of the overcharge and the like are made for the individual unit batteries 10 or for the entire unit batteries 10. When the individual unit batteries 10 are detected, a battery voltage may be detected, or a positive electrode potential or a negative electrode potential may be detected. In the latter case, a Li electrode used as a reference electrode is inserted into each of the unit batteries 10. In the battery pack 20 shown in FIG. 6 and FIG. 7, a wiring 35 for detecting voltage is connected to each of the unit batteries 10, and the detected signals are transmitted to the protective circuit 26 through these wirings 35.

A protective sheet 36 formed of rubber or resin is disposed on each of the three side surfaces of the battery module 23 except for the side surface from which the positive electrode terminal 7 and the negative electrode terminal 6 protrude.

The battery module 23 is stored in a storage container 37 together with each of the protective sheets 36 and the printed wiring board 24. Namely, the protective sheet 36 is disposed on each inside surface in the direction of the long side and on one of the inside surfaces in the direction of the short side of the storage container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the storage container 37.

Here, a thermal shrinkage tape may be used in place of the adhesive tape 22 to secure the battery module 23. In this case, the protective sheet is disposed on both sides of the battery module, and the thermal shrinkage tape is wound around the battery module; thereafter, the thermal shrinkage tape is shrunk by heating to fasten the battery module.

Although the battery pack 20 shown in FIGS. 6 and 7 has such a form that a plural of the unit batteries 10 are connected in series, in the battery pack according to the third embodiment, a plural of unit batteries may be connected in parallel to increase the capacity of the battery. Alternatively, the battery pack according to the third embodiment may be provided with a plural of unit batteries connected by combining series connection and parallel connection. The assembled battery packs may be further connected in series or in parallel.

Although the battery pack 20 shown in FIGS. 6 and 7 is provided with a plural of the unit batteries 10, the battery pack according to the third embodiment may be provided with a single unit battery.

The embodiment of the battery pack is appropriately changed according to its use. The battery pack according to the present embodiment is preferably used in applications required that excellent cycle performances are exhibited when a large current is extracted. Specific examples of these applications include power sources for digital cameras, and power sources mounted on vehicles such as two-wheel or four-wheel hybrid electric vehicles, two-wheel or four-wheel electric vehicles, and assist bicycles. In particular, the battery pack is preferably used for power sources mounted on vehicles.

Since the battery pack according to the third embodiment includes the nonaqueous electrolyte battery according to the second embodiment, excellent rate characteristics can be exhibited.

EXAMPLES

Hereinafter, examples will be described, and the present invention is not limited to the examples described below insofar as the examples do not deviate from the spirit of the invention.

Example 1

In Example 1, an electrode similar to the electrode 5 shown in FIG. 1 was produced by the following procedure.

As an electrode active material, iron-containing lithium manganese phosphate $LiMn_{0.8}Fe_{0.2}PO_4$ was provided. The provided iron-containing lithium manganese phosphate particles were secondary particles obtained by granulating primary particles with a particle diameter of 80 nm and having an average particle diameter of 15 µm and were coated with carbon. The particle diameter of the primary particles was estimated from SEM observation. The average particle diameter of the secondary particles was an average particle diameter (D50: a particle diameter of integration 50%) in particle diameter distribution obtained from particle diameter distribution measurement applied to the electrode active material. This active material, acetylene black, and polyvinylidene-fluoride (PVdF) were added to N-methyl-pyrrolidone (NMP) so that the mass ratio was 90% by mass:5% by mass:5% by mass, to be kneaded, and, thus, to prepare a slurry. The prepared slurry was coated onto an aluminum foil current collector having a thickness of 15 µm, then dried, and subsequently pressed by a roller, whose temperature was set to 80° C., with a load of 1.5 t/cm. Thus, an electrode in which the density of the electrode layer was 2.05 g/cm³ was produced.

An evaluation cell was produced in accordance with the following procedure using the produced electrode.

In dry argon, the electrode produced as described above was made to face Li metal, which was a counter electrode, through a glass filter (separator) as a separator, and Li metal was inserted as a reference electrode so as not to be in contact with the electrode and the Li metal as the counter electrode. These members were put in a three-electrode glass cell, and the electrode, the counter electrode, and the reference electrode were respectively connected to a terminal of the glass cell. Then, an electrolyte was poured into the glass cell to allow the separator, the electrode, the counter electrode, and the reference electrode to be sufficiently impregnated with the electrolyte. In this state, a glass container was sealed to produce the evaluation cell of Example 1.

As the electrolyte poured into the glass cell, there was used an electrolyte prepared by dissolving $LiPF_6$ at a concentration of 1.0 mol/L in a mixed solvent prepared by blending ethylene carbonate (EC) with diethyl carbonate (DEC) in a ratio by volume of 1:2.

Examples 2 to 5 and Comparative Examples 1 to 4

The evaluation cells of Examples 2 to 5 and Comparative Examples 1 to 4 were produced similarly to Example 1, except that the production conditions of the electrode were changed as shown in Table 1.

Examples 6 to 13 and Comparative Examples 5 to 7

The evaluation cells of Examples 6 to 13 and Comparative Examples 5 to 7 were produced similarly to Example 1, except that the active material was changed into each material shown in Table 1, and the production conditions of the electrode were changed as shown in Table 1.

TABLE 1

| | Active material | Primary particle diameter (nm) | Average particle diameter of secondary particles (µm) | Press frequency (times) | Press conditions |
|---|---|---|---|---|---|
| Example 1 | $LiMn_{0.8}Fe_{0.2}PO_4$ | 80 | 15 | 1 | 80° C., 1.5 t/cm |
| Example 2 | $LiMn_{0.8}Fe_{0.2}PO_4$ | 110 | 22 | 2 | 25° C., 1.1 t/cm/25° C., 1.4 t/cm |
| Example 3 | $LiMn_{0.8}Fe_{0.2}PO_4$ | 50 | 18 | 1 | 25° C., 1.6 t/cm |
| Example 4 | $LiMn_{0.8}Fe_{0.2}PO_4$ | 90 | — | 1 | 80° C., 1.6 t/cm |
| Example 5 | $LiMn_{0.8}Fe_{0.2}PO_4$ | 50 | 13 | 2 | 25° C., 1.1 t/cm/25° C., 1.5 t/cm |
| Example 6 | $LiMn_{0.8}Fe_{0.1}Mg_{0.1}PO_4$ | 100 | 20 | 1 | 25° C., 1.5 t/cm |
| Example 7 | $LiMn_{0.9}Fe_{0.05}Mg_{0.05}PO_4$ | 80 | 21 | 1 | 25° C., 1.6 t/cm |
| Example 8 | $LiMn_{0.7}Fe_{0.2}Mg_{0.1}PO_4$ | 80 | 17 | 1 | 25° C., 1.6 t/cm |
| Example 9 | $LiMn_{0.85}Fe_{0.1}Ca_{0.05}PO_4$ | 90 | 19 | 1 | 25° C., 1.5 t/cm |
| Example 10 | $LiMn_{0.85}Fe_{0.1}Al_{0.05}PO_4$ | 80 | 22 | 1 | 25° C., 1.5 t/cm |
| Example 11 | $LiMn_{0.85}Fe_{0.1}Ti_{0.05}PO_4$ | 80 | 24 | 1 | 25° C., 1.5 t/cm |
| Example 12 | $LiMn_{0.85}Fe_{0.1}Zn_{0.05}PO_4$ | 100 | 18 | 1 | 25° C., 1.6 t/cm |
| Example 13 | $LiMn_{0.85}Fe_{0.1}Zr_{0.05}PO_4$ | 120 | 25 | 1 | 25° C., 1.6 t/cm |
| Comparative Example 1 | $LiMn_{0.8}Fe_{0.2}PO_4$ | 80 | — | 1 | 25° C., 1.6 t/cm |
| Comparative Example 2 | $LiMn_{0.8}Fe_{0.2}PO_4$ | 110 | — | 1 | 80° C., 1.6 t/cm |
| Comparative Example 3 | $LiMn_{0.8}Fe_{0.2}PO_4$ | 80 | 25 | 2 | 25° C., 1.1 t/cm/25° C., 1.5 t/cm |
| Comparative Example 4 | $LiMn_{0.8}Fe_{0.2}PO_4$ | 90 | 28 | 1 | 25° C., 1.6 t/cm |
| Comparative Example 5 | $LiMnPO_4$ | 60 | 17 | 1 | 25° C., 1.6 t/cm |
| Comparative Example 6 | $LiMn_{0.9}Mg_{0.1}PO_4$ | 80 | 20 | 1 | 25° C., 1.6 t/cm |
| Comparative Example 7 | $LiMn_{0.8}Mg_{0.2}PO_4$ | 90 | 19 | 1 | 25° C., 1.6 t/cm |

[Evaluation of Rate Characteristics]

As described above, charge-discharge test was conducted on each of the produced evaluation cells of Examples 1 to 13 and Comparative Examples 1 to 7 in an environment of 25° C., at a charge/discharge rate of 0.1 C, and in a potential range of 2.0 V to 4.3 V.

Moreover, charge-discharge test was conducted on each of the evaluation cells of Examples 1 to 13 and Comparative Examples 1 to 7 in an environment of 25° C., at a charge/discharge rate of 1 C, and in a potential range of 2.0 V to 4.3 V.

The rate characteristics (1 C/0.1 C rate) in each evaluation cell obtained by those charge-discharge tests are shown in the following Table 2.

[Measurement of Pore Diameter Distribution]

An electrode was taken out from the evaluation cells of Examples 1 to 13 and Comparative Examples 1 to 7, produced as described above, according to the aforementioned procedure, and the pore diameter distribution was measured by mercury porosimetry according to the aforementioned procedure. In the measurement of the pore diameter distribution, Shimadzu Autopore 9520 was used.

Figure 8:
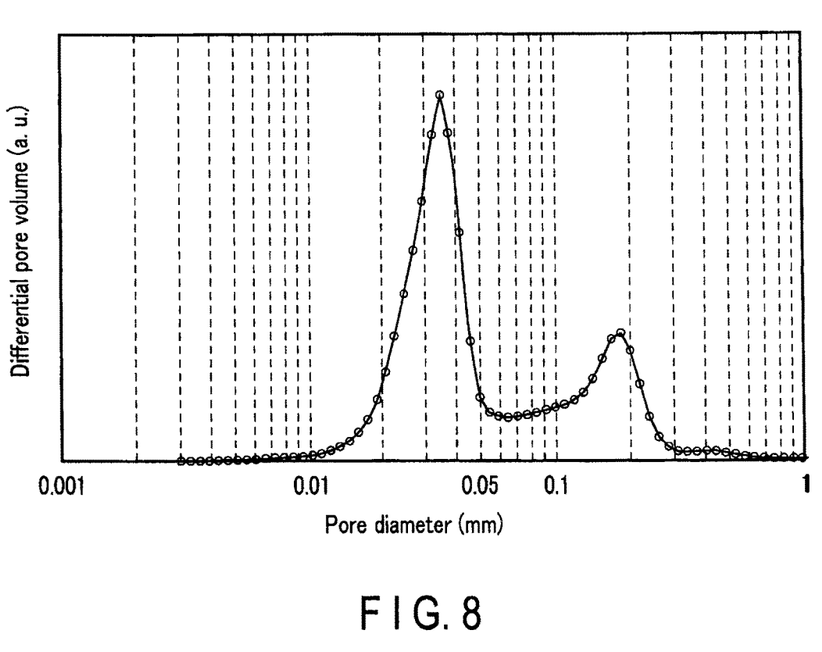
FIG. 8 shows of pore diameter distribution of a positive electrode layer of a nonaqueous electrolyte battery of Example 1.

FIG. 8 shows the pore diameter distribution of the electrode of the evaluation cell of Example 1. As seen in FIG. 8, in the pore diameter distribution of the electrode of Example 1, there is a maximum peak at 22 nm, and namely, the pore diameter appearing at highest frequency is 22 nm.

The pore diameter appearing at highest frequency in the pore diameter distribution, the pore specific surface area, and the pore volume in each electrode of the evaluation cells of Examples 1 to 13 and Comparative Examples 1 to 7 were obtained from the obtained pore diameter distribution. Those results are shown in the following Table 2, together with the density of the electrode 5 of each of the evaluation cells of Examples 1 to 13 and Comparative Examples 1 to 7.

evaluation cells of Comparative Examples 1 and 2 in which the pore diameter appearing at highest frequency and the pore specific surface area are outside of the above ranges, the evaluation cell of Comparative Example 3 in which the pore specific surface area is outside of the above range, and the evaluation cell of Comparative Example 4 in which the pore diameter appearing at highest frequency is outside of the above range.

From the results of Examples 1 to 13, it is found that even if an electrode contains active materials other than iron-containing lithium manganese phosphate $LiMn_{0.8}Fe_{0.2}PO_4$, as long as the electrode contains iron-containing lithium manganese phosphate as an active material, excellent rate characteristics can be exhibited as long as the above pore diameter appearing at highest frequency and the above pore specific surface area are in the above ranges.

Meanwhile, from the results of Comparative Examples 5 to 7, it is found that the electrode containing, as the active material, lithium manganese phosphate containing no iron cannot exhibit excellent rate characteristics even if the above pore diameter appearing at highest frequency and the above pore specific surface area are in the above ranges.

In the electrode according to at least one embodiment and Examples described above, in the pore diameter distribution of the positive electrode containing iron-containing lithium manganese phosphate, the pore diameter appearing at highest frequency is in the range of 10 nm to 50 nm, and the pore specific surface area of the electrode layer is from 12 $m^2/g$ to 30 $m^2/g$, so that a nonaqueous electrolyte battery excellent in rate characteristics can be achieved.

TABLE 2

| | Active material | Pore diameter of maximum peak in pore diameter distribution (nm) | Pore specific surface area ($m^2/g$) | Pore diameter (mL/g) | Electrode Density ($g/cm^3$) | 1 C/0.1 C rate (%) |
|---|---|---|---|---|---|---|
| Example 1 | $LiMn_{0.8}Fe_{0.2}PO_4$ | 22 | 17.8 | 0.183 | 2.05 | 97.3 |
| Example 2 | $LiMn_{0.8}Fe_{0.2}PO_4$ | 46 | 15 | 0.205 | 1.9 | 95.9 |
| Example 3 | $LiMn_{0.8}Fe_{0.2}PO_4$ | 13 | 24.1 | 0.199 | 2.1 | 98 |
| Example 4 | $LiMn_{0.8}Fe_{0.2}PO_4$ | 48 | 12.1 | 0.17 | 2.3 | 95.2 |
| Example 5 | $LiMn_{0.8}Fe_{0.2}PO_4$ | 11 | 29.2 | 0.258 | 2 | 98 |
| Example 6 | $LiMn_{0.8}Fe_{0.1}Mg_{0.1}PO_4$ | 35 | 24.5 | 0.261 | 1.9 | 97.2 |
| Example 7 | $LiMn_{0.9}Fe_{0.05}Mg_{0.05}PO_4$ | 29 | 27.4 | 0.206 | 1.95 | 95.1 |
| Example 8 | $LiMn_{0.7}Fe_{0.2}Mg_{0.1}PO_4$ | 26 | 26.4 | 0.185 | 2.1 | 98 |
| Example 9 | $LiMn_{0.85}Fe_{0.1}Ca_{0.05}PO_4$ | 21 | 21.5 | 0.171 | 2 | 93.7 |
| Example 10 | $LiMn_{0.85}Fe_{0.1}Al_{0.05}PO_4$ | 28 | 21.2 | 0.21 | 1.95 | 93 |
| Example 11 | $LiMn_{0.85}Fe_{0.1}Ti_{0.05}PO_4$ | 29 | 23 | 0.19 | 1.9 | 96.6 |
| Example 12 | $LiMn_{0.85}Fe_{0.1}Zn_{0.05}PO_4$ | 30 | 22.6 | 0.171 | 2.15 | 95 |
| Example 13 | $LiMn_{0.85}Fe_{0.1}Zr_{0.05}PO_4$ | 39 | 14 | 0.194 | 2.1 | 93.7 |
| Comparative Example 1 | $LiMn_{0.8}Fe_{0.2}PO_4$ | 80 | 11.5 | 0.154 | 2.1 | 90 |
| Comparative Example 2 | $LiMn_{0.8}Fe_{0.2}PO_4$ | 133 | 9.1 | 0.131 | 2.1 | 87.1 |
| Comparative Example 3 | $LiMn_{0.8}Fe_{0.2}PO_4$ | 44 | 10.7 | 0.149 | 2.1 | 89.6 |
| Comparative Example 4 | $LiMn_{0.8}Fe_{0.2}PO_4$ | 58 | 13.7 | 0.166 | 2.05 | 89.7 |
| Comparative Example 5 | $LiMnPO_4$ | 19 | 17.3 | 0.192 | 2 | 77.1 |
| Comparative Example 6 | $LiMn_{0.9}Mg_{0.1}PO_4$ | 29 | 15 | 0.2 | 2 | 89.5 |
| Comparative Example 7 | $LiMn_{0.8}Mg_{0.2}PO_4$ | 33 | 14.5 | 0.187 | 2.05 | 89.9 |

From the results of Table 1, it is found that the evaluation cells of Examples 1 to 5 in which the pore diameter appearing at highest frequency in the pore diameter distribution of the electrode was in a range of 10 nm to 50 nm and the pore specific surface area was in a range of 12 $m^2/g$ to 30 $m^2/g$ are more excellent in the rate characteristics than the While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
   a current collector; and
   an electrode layer formed on the current collector and containing an active material represented by $LiMn_{1-x-y}Fe_xA_yPO_4$ (wherein $0<x\leq0.3$, $0\leq y\leq0.1$, and A is at least one selected from the group consisting of Mg, Ca, Al, Ti, Zn, and Zr),
   wherein a pore diameter appearing at highest frequency in pore diameter distribution of the electrode layer obtained by mercury porosimetry falls within a range of 10 nm to 50 nm, and a pore specific surface area of the electrode layer is from 12 $m^2$/g to 30 $m^2$/g, and
   wherein a pore volume of the electrode layer is from 0.17 mL to 0.29 mL per 1 g of the electrode layer.

2. The electrode according to claim 1, wherein a density of the electrode layer is from 2 g/cm3 to 2.3 g/cm3.

3. The electrode according to claim 1, wherein a carbon material is adhered to at least a portion of a surface of the active material.

4. The electrode according to claim 3, wherein the carbon material is a carbonaceous material having an interplanar spacing $d_{002}$ at a (002) plane as measured by powder X-ray diffraction of 0.344 nm or more.

5. The electrode according to claim 1, wherein the current collector comprises an aluminum foil, or an aluminum alloy foil containing at least one element selected from Mg, Ti, Zn, Mn, Fe, Cu, and Si.

6. The electrode according to claim 1, wherein the electrode layer further contains at least one selected from the group consisting of lithium-manganese composite oxide, lithium-nickel composite oxide, lithium-cobalt composite oxide, lithium-nickel-cobalt composite oxide, lithium-manganese-cobalt composite oxide, lithium-nickel-cobalt-manganese composite oxide, lithium-nickel-cobalt-aluminum composite oxide, and lithium-manganese-nickel composite oxide having a spinel structure.

7. A nonaqueous electrolyte battery comprising:
   a negative electrode containing a negative electrode active material;
   a positive electrode; and
   a nonaqueous electrolyte,
   wherein the positive electrode is the electrode according to claim 1.

8. The nonaqueous electrolyte battery according to claim 7, wherein a Li insertion/extraction potential of the negative electrode active material is 0.8 V (vs. Li/Li+) or more.

9. The nonaqueous electrolyte battery according to claim 7, wherein the negative electrode active material contains at least one of lithium titanate having a spinel structure and monoclinic β-type titanium composite oxide.

10. A battery pack comprising the nonaqueous electrolyte battery according to claim 7.

* * * * *